Figure 1:
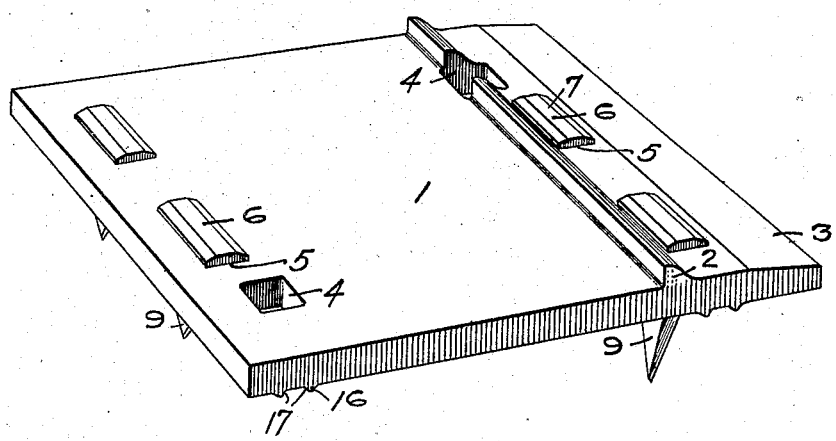

W. GOLDIE, Jr.
TIE PLATE.
APPLICATION FILED DEC. 3, 1907.

911,230.

Patented Feb. 2, 1909.

2 SHEETS—SHEET 1.

WITNESSES.

INVENTOR.

W. GOLDIE, Jr.
TIE PLATE.
APPLICATION FILED DEC. 3, 1907.

911,230.

Patented Feb. 2, 1909.
2 SHEETS—SHEET 2.

WITNESSES.
J. R. Keller
Robert C. Totten

INVENTOR.
William Goldie Jr.
By Kay Totten & Winter
Attorneys

THE NORRIS PETERS CO., WASHINGTON, D. C.

UNITED STATES PATENT OFFICE.

WILLIAM GOLDIE, JR., OF BAY CITY, MICHIGAN.

TIE-PLATE.

No. 911,230.     Specification of Letters Patent.     Patented Feb. 2, 1909.

Application filed December 3, 1907. Serial No. 404,933.

*To all whom it may concern:*

Be it known that I, WILLIAM GOLDIE, Jr., a resident of Bay City, in the county of Bay and State of Michigan, have invented a new and useful Improvement in Tie-Plates; and I do hereby declare the following to be a full, clear, and exact description thereof.

My invention relates to tie plates, its object being to provide a cheap and efficient form of tie plate adapted to give an exceedingly firm or strong connection between the tie plate and the tie.

In the manufacture of what are known as claw tie plates the practice has been to roll the bar from which the plates are formed with flanges extending along each side near the edges, then to shear away the surplus metal of the flange so forming the claws, and then to sharpen the claws by an oblique shearing operation. In making such claw plates having integral claws, on account of the peculiar section of bar, serious difficulty has been encountered in rolling the bar with sufficiently deep flanges on the lower surface to form the claws. Their manufacture has also been costly because the greater portion of the metal of the flanges so rolled was cut away in forming the claws, involving great waste of metal and expensive handling. The tie plates have also had further objections; for example, it was impracticable to sharpen the claws by shearing if the flanges and claws were formed any great distance in from the edge of the plate, as the projecting edge of the plate interferes with the downward stroke of the shearing die in sharpening the claws; and therefore the claws could not be formed as far under the plate as desirable, that is, could not well be brought under or near to the portion of the plate on which the rail rested. The most desirable form of claw was pointed or V-shaped, and when produced from the integral flange it had its cutting edges along the inner face of the claw and had inclines on the opposite or outer face thereof, such claws being produced by shearing the metal obliquely and in the direction of the length of the claw, the tie plate being held at an incline over a die for such purpose. In order to resist the downward and outward stress brought on the tie plate it is desirable that the claw shall have a broad flat outer face to give a positive bearing against the solid and unbent fibers of the tie, and while the sharp cutting edges of the integral claw were adapted to form such a face, it was formed on the inner, that is, the wrong side of the claw because the outer inclined faces of the claw would necessarily bend back the fiber in front of them and so disturb it instead of forming the desirable solid sheared face to resist such outward stress.

By my invention I am enabled to improve these tie plates in the above points, providing a tie plate less expensive to manufacture, and making it possible to have the claws brought near to or even under the part of the plate on which the rail rests, while I am also enabled to locate the cutting edges on the claws in such way as to give it the greatest power to resist lateral strain.

It consists, generally stated, in a railroad tie plate having a body portion provided with a slot extending through the same, in combination with a separate claw pin extending through the slot and permanently fastened therein and having a projecting portion below the plate body to enter into the tie; the claw in its preferred form having a relatively thick body extending through the slot and riveted therein, and a thinner body portion extending below the same to enter the tie; and as the claws may be sharpened before being riveted within the plate I am enabled to make the claw of any length, and to locate the claw in any position desired, such as with its flat face toward the outer edge of the tie plate so that in use it will cut in the tie a clean seat for its outer face, giving the strong support of the unbent fiber to sustain the same against outer or lateral strain. It also consists in certain other improvements hereinafter more fully set forth.

Figure 2:
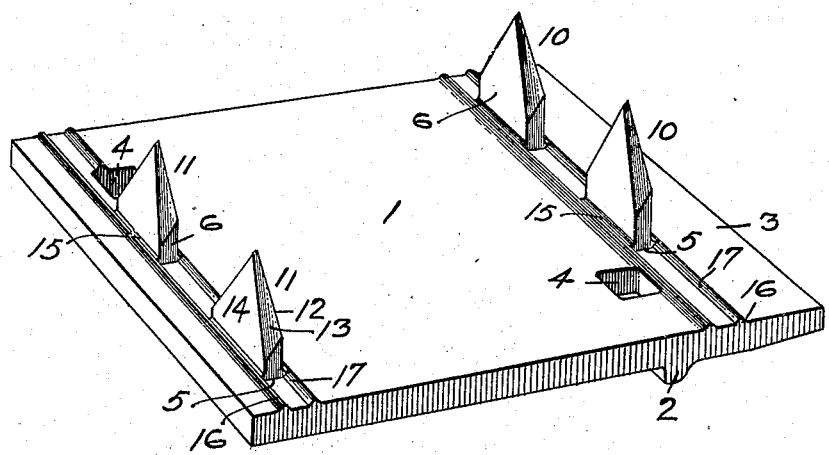
Figure 3:
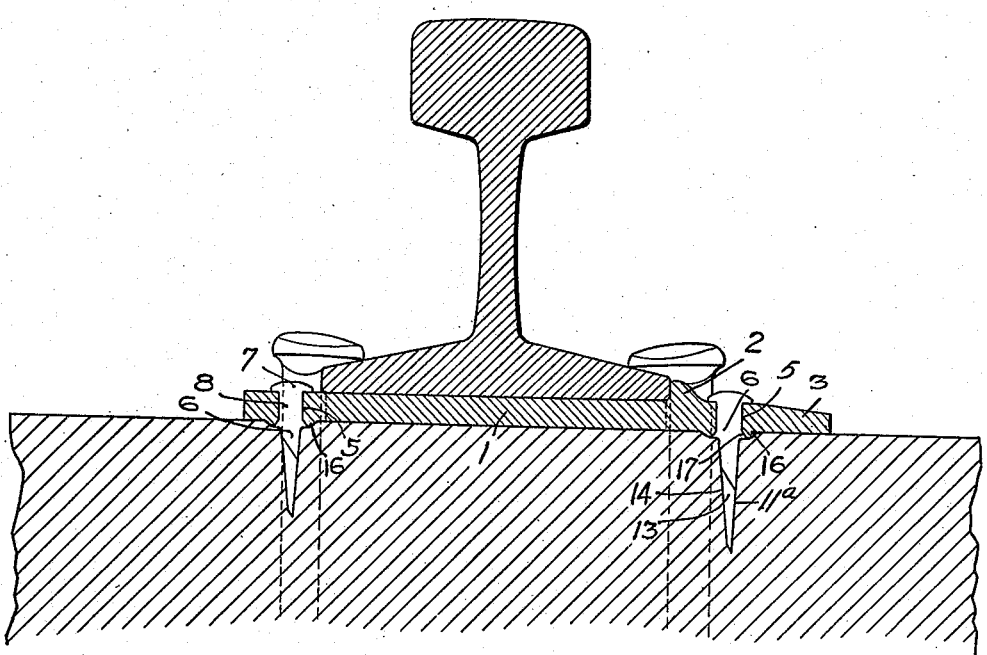
Figure 4:
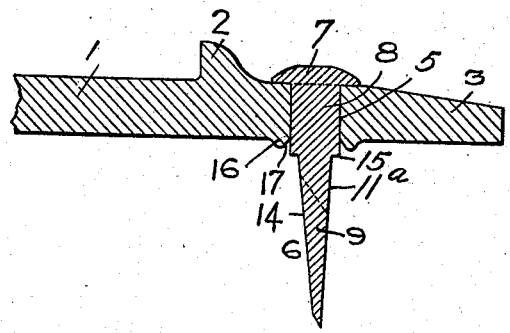
Figure 5:
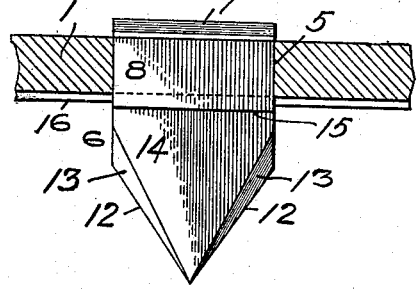
Figure 6:
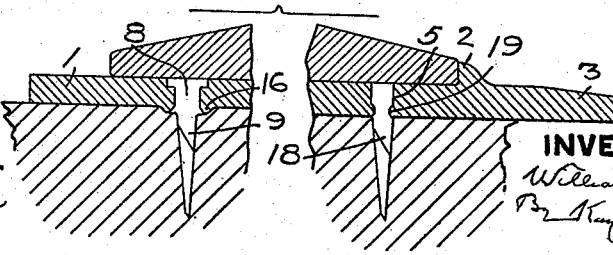

In the accompanying drawings Figure 1 is a perspective view of the plate; Fig. 2 is a like view of the same in inverted position; Fig. 3 is a cross section showing the plate as applied to the tie; Fig. 4 is an enlarged detail cross section through the tie plate and claw pin; Fig. 5 is a detail cross section at right angles to Fig. 4; and Fig. 6 is a view of the tie plate illustrating the same with the claws seated under the rails.

The plate body 1 is rolled as an ordinary bar, and may be formed of any desired section, having preferably the shoulder 2 on its upper face to receive the outward lateral thrust of the rail body. This forms an exceedingly cheap and easy section to roll. The tie plates are cut from this bar, and the bar at the same time is punched, being provided with the ordinary spike holes 4, and also having formed in it a number of slots 5 corresponding to the number of claws desired in the plate, it being practicable to locate the same at any desired place in the plate body except of course directly under the shoulder 2, though, as shown, the claws can be brought very close to this shoulder and in proper downward diagonal position to sustain the downward and outward strain in carrying the heavy load of the passing train. In each such slot 5 is permanently secured the claw pin 6, the most suitable way of fastening the claw in place being by riveting the plate and claw body together. The claw has preferably the head 7, the relatively thick body portion 8, and the thinner claw portion 9. The claw extends beyond the bottom of the plate for any depth desired, there being no limit upon the length of claw, and it being possible to obtain a much deeper one than when the claws are formed from flanges rolled integral with the bar, and to form a sharper cutting edge thereon.

In general practice as shown in the drawing I prefer to place the claws at the outer side of the plate close up to the shoulder 2, as shown at 10, 10, and as so placed the claws where they project through the tie plate are on the natural inclined line of stress from the shoulder through the tie plate into the tie, being located in proper position to sustain the downward and outward strain when brought upon the plate in carrying the load. They also coöperate with the wide extension 3 of the plate beyond the shoulder 2 in distributing to the tie the outward and downward stress brought upon the plate, and prevent rapid cutting or wearing of the plate into the tie. The claws 11 at the inner side of the plate may of course be placed in like position, or in any desired position according to the width of the plate. They are illustrated as being closer to the inner edge of the plate than are the claws 10 to the outer edge. The claw portions 9 are shown as of triangular form, having on one side the flat face 11 and the cutting edges 12, and on the other side the inclined faces 13 and the part 14 above them. It will be noticed that each claw at the outer side of the plate has its flat face 11 toward the outer edge of the plate. This enables the cutting edges to cut into the tie body in line with that flat face 11, severing the fiber so as to leave a solid supporting wall against which this outer flat face of the claw presses, so giving a solid cleanly cut and unbent face in the tie to sustain outward strain on the tie plate; the wood fiber necessary to form the mortise for the claw being bent back by the inclined faces 13 and so traveling onto the opposite or inner face 14 of the claw. The claws at the inner edge of the plate are illustrated as arranged in the same way, that is, with their flat faces toward the outer side of the plate to sustain the outer thrust brought upon the plate.

The claw and plate may be permanently secured together in any desired way, such as by riveting and by any suitable form of riveting. The simplest means of riveting for the purpose is illustrated in Fig. 4 in which the upper portion 8 of the claw, below the head 7, is made of greater thickness than the lower portion 9 forming the projecting part of the claw above described. This upper portion 8 projects slightly below the body of the plate, as at 15, and so provides metal for riveting to hold the claw in place. In order to provide a flaring seat to receive the metal so spread I may roll upon the lower face of the tie plate the slight V-shaped projecting ribs 16 which extend a slight distance beyond the lower face and when the slot 5 is punched into the plate its lower edges will register with the inner faces of these ribs and so form seats 17 into which the lower edges 15 of the thick body portion 8 of the claw may be spread in riveting to place. Another suitable way of riveting the claw is illustrated in Fig. 6, in which the claw 18 is provided with side depressions 19 at the base of its thick body portion, into which the metal of the plate may be riveted to hold the claw in place.

The claws employed in connection with the plate can be made rapidly and at low cost, it only requiring the rolling of a bar of the desired section, the cutting of the same to proper length, and then the oblique shearing of the lower end to form the points. In this way there is no waste of metal except in pointing the claws. The plate can be quickly made, the rolled bars being cut to length and punched at one time, and it only requiring the insertion of the claw pins in their sockets and the riveting of the claws in place, an operation which can be quickly and practically automatically performed as described in an application filed by me of even date herewith, Serial No. 404,932. It is also evident that these claws can be secured in any part of the plate according to the desire of the user. In Fig. 6 I have illustrated the placing of the claws directly under the rail, the only requirement in such case being that the claws shall be riveted so as to be flush with or below the top surface of the plate.

What I claim is:

1. A railroad tie plate having a body portion provided with a slot extending through the same, in combination with a claw pin extending through the slot and permanently fastened in the plate and having a projecting portion below the plate body to enter into the tie.

2. A railroad tie plate having a body portion provided with a slot extending through the same, in combination with a claw pin extending through the slot and riveted therein and having a projecting portion below the plate body to enter into the tie.

3. A railroad tie plate having a body portion provided with a slot extending through the same, in combination with a claw pin having a thick portion fitting within the slot and held therein by riveting and a thinner body portion extending below the same to enter the tie.

4. A railroad tie plate having a body portion provided with a slot extending through the same, in combination with a claw pin extending through the slot and permanently fastened in the plate and having a projecting portion below the plate body having a sharpened edge adapted to enter the tie.

5. A railroad tie plate having a body portion provided on its upper face with an integral shoulder to receive the outward thrust of the rail, and a claw located between said shoulder and the outer edge of the plate and having a flat face toward the outer edge of the plate and inclined faces on the opposite side of the claw so as to provide it with sharpened edges.

6. A railroad tie plate having a body portion provided on its upper face with an integral shoulder to receive the outward thrust of the rail, and having beyond and out of line with but close to said shoulder and set back from the outer edge of the plate a claw projecting downwardly from the plate.

7. A railroad tie plate having a body portion provided with a slot extending through the same and having V-shaped projections on its lower face at the margins of said slot, in combination with a claw pin having a thick portion extending through and fitting in the slot, and a thinner portion extending below the same to enter the tie, the lower edge of the thick portion being spread between the said ribs on the lower face of the plate.

In testimony whereof, I the said WILLIAM GOLDIE Junior have hereunto set my hand.

WILLIAM GOLDIE, JR.

Witnesses:
ROBERT C. TOTTEN,
J. R. KELLER.